3,057,742
WALL PLASTERS AND THEIR PREPARATION
Kenneth Gerrard Cunningham, Saltcoats, Ayrshire, and Andrew Jamieson Baillie, Beith, Ayrshire, Scotland, assignors to Imperial Chemical Industries Limited, London, England, a corporation of Great Britain
No Drawing. Filed Sept. 11, 1959, Ser. No. 839,287
4 Claims. (Cl. 106—115)

The present invention relates to an improved process for the manufacture of plasters of the kind based on calcium sulphate hemihydrate and calcium hydroxide in association together, and to improved plasters resulting therefrom. The invention relates especially to plasters containing calcium hydroxide and retarded calcium sulphate hemihydrate.

In the manufacture of such plasters, hitherto the most satisfactory method has been to mix the dry calcium sulphate hemihydrate, which may contain a retarding agent already mixed with it, into what is known as "putty run from quicklime," that is to say a putty containing about half its weight of water obtained by storing for several weeks a paste made by slaking quicklime with more water than is required to form slaked lime, and subsequently breaking up and screening the paste. Further water is added as required at the mixing stage to produce a plaster of suitable consistency. It is also known to add the dried retarded hemihydrate and if necessary further water to a putty made from commercially available dry hydrated lime and water, which has been stored for a period of at least 16 hours and preferably longer, but even when there is used a putty run from hydrated lime matured for the periods recommended by the manufacturers, the resulting plasters are inferior to those made from well matured putty run from quicklime. The effects of insufficient maturing of the lime include the disadvantages that the amount of water that can be introduced to give a plaster of satisfactory consistency for application is reduced, that the plaster does not flow so well under the trowel, and that shrinkage and cracking occur more readily when it is freshly applied to an absorbent background. This kind of cracking is known as "firecracking." Although there are obvious economic advantages in the employment of a putty run from hydrated lime instead of a putty run from quicklime, many plasterers still prefer to employ putty run from quicklime as the basis for the preparation of their hemihydrate lime plasters since they find it impracticable to obtain a plaster of satisfactory properties in the above respects starting with dry hydrated lime. Moreover, when such plasters are made from hydrated lime, it has hitherto still been essential to make up and mature the lime putty before adding the retarded calcium sulphate hemihydrate, since the hemihydrate is required to set within a period much less than that which would be required to mature the lime putty.

It would, however, be very desirable for a plasterer to be able to make a hemihydrate-lime plaster by mixing together dry hydrated lime and suitably retarded calcium sulphate hemihydrate and then add the required amount of water to the resulting dry mixture, and that the plaster so obtained should be suitable for use without any maturing period.

The present invention provides a new dry plaster mixture consisting of a mixture comprising dry hydrated lime, retarded calcium sulphate hemihydrate and a small percentage of a finely divided cellulose alkyl, hydroxy alkyl or alkyl-hydroxyalkyl ether having a viscosity of not less than about 500 centipoises in 2 percent aqueous solution at 15° C., the ratio by weight of the calcium sulphate hemihydrate to calcium hydroxide being from 4:1 to 1:4.

According to the process of the present invention, in preparing the plaster the water is mixed with the aforesaid dry mixture, and is then ready for use. The conventional retarding agents for the hemihydrate may be used, e.g. those of protein character.

The cellulose ether is preferably fine enough to pass a 100 mesh B.S. screen and material of the requisite fineness may be obtained by milling the cellulose ether either in fibrous condition or non-fibrous condition. In general, the higher the viscosity of the cellulose ether the less is required and it is preferred to use material of viscosity not less than 2,000 centipoises in 2 percent aqueous solution at 15° C. The amount required will, in general, be about 0.2 to 1.0 percent based on the weight of the solids. Methyl cellulose, hydroxy ethyl cellulose and methyl hydroxy-ethyl cellulose of the above viscosity are commercially available and may be used. At present the highest viscosity products commercially available are methyl cellulose and hydroxy-ethyl cellulose of viscosity approximately 4,250 centipoises, and these are especially suitable.

The water may be mixed into the solids on a board or in a bucket or tank with the assistance of a hand mixing tool or a simple mechanical mixing device. If desired, fillers of mineral or vegetable character and colouring materials may be included in the compositions. Amongst these may be mentioned such materials as sand, or fibrous or low density fillers such as asbestos or perlite.

It is an advantage of the invention that the mixing of the water into the dry hemihydrate-hydrated lime mixture, or vice versa, is an operation that requires less skill and supervision and also less physical effort than the mixing of calcium sulphate hemihydrate and water into a matured lime putty, and it is obviously an advantage that no time is required for maturing the lime component. The resulting plasters must, of course, be applied before the hemihydrate causes their setting.

Other advantages of the plasters produced according to the present invention over hemihydrate plasters run from hemihydrated lime or quicklime include the following:

They contain more water per part by weight of dry solids at the most desirable consistency for spreading under the trowel and are therefore more economical in use; they are less liable to shrinkage and firecracking when freshly applied to absorbent surfaces; the rate at which the water is absorbed from them by absorbent surfaces is lower, so when the hemihydrate component causes the plaster to set on the surface, the coating is in a more moist condition and can be more readily smoothed in the finishing operation with the trowel; when dry they adhere better to surfaces such as concrete, wood and plasterboard, and the dried plaster coating is less brittle.

Although the addition of cellulose ethers to plasters and putties made from calcium sulphate hemihydrate in the absence of lime noticeably increases the tendency of the fluid material to adhere to the trowel, the plasters of the present invention do not exhibit this disadvantage, notwithstanding the fact that they adhere well to the surface to which they are applied once they have set and dried.

The invention is further illustrated in the following examples in which the parts and percentages are by weight.

Example 1

50 parts hydrated lime powder are mixed with 50 parts retarded calcium sulphate hemihydrate and 0.3 part of methyl cellulose of viscosity 4,000 centipoises in 2 percent aqueous solution at 15° C. in the form of a fine fibrous powder passing a 100 mesh B.S. screen. The whole of 70 parts of water are then poured into the dry solid mixture, the particles of which are rapidly wetted. The contents of the mixing vessel are then hand mixed with a stirring implement to complete the preparation of the plaster, which is then ready for immediate application as an interior finishing plaster for walls and ceiling.

*Example 2*

The procedure is the same as in Example 1 except that the ingredients of the plaster consist of 75 parts hydrated lime powder, 25 parts retarded calcium sulphate hemihydrate, 0.5 part hydroxy-ethyl cellulose in the form of a fine fibrous powder passing a 100 mesh B.S. screen and of viscosity 4,500 centipoises in 2 percent aqueous solution, and 81 parts water. The resulting plaster is ready for immediate use as an interior wall or ceiling plaster.

*Example 3*

The procedure is the same as in Example 1 except that the ingredients are 33 parts hydrated lime powder, 67 parts retarded calcium sulphate hemihydrate, 0.25 part methyl hydroxy-ethyl cellulose in the form of a fine granular powder passing a 100 mesh B.S. screen and of viscosity 3,500 centipoises in 2 percent aqueous solution and 58 parts water. The result in plaster is suitable for the same purposes as that of Example 1.

*Example 4*

The solid ingredients consist of a mixture of 50 parts hydrated lime powder, 50 parts retarded calcium sulphate hemihydrate, 0.7 part methyl cellulose in the form of a fine fibrous powder passing a 100 mesh B.S. screen and having a viscosity of 1,500 centipoises in 2 percent aqueous solution, and 71 parts water. The dry solids are mixed and run into the water, and the contents of the mixing vessel are mixed with a paddle. The resulting plaster is ready for immediate use for the same purposes as that of Example 1.

The plaster coatings obtained when the plasters according to Examples 1 to 4 are applied in tests as finishing coatings on party walls have exhibited satisfactory adhesion for more than one year and oil paint films applied with undercoat normally recommended for use over alkaline plasters have retained their adhesion well for more than one year.

What we claim is:

1. A dry plaster mixture consisting essentially of dry hydrated lime, set retarded calcium sulphate hemihydrate and from about 0.2 to 1% based on the weight of the solids of a cellulose ether selected from the group consisting of methyl cellulose, hydroxy ethyl cellulose and methyl hydroxy ethyl cellulose having a viscosity of not less than about 500 centipoises in 2% aqueous solution at 15° C. and being sufficiently fine to pass a 100 mesh B.S. screen, the ratio by weight of calcium sulphate hemihydrate to calcium hydroxide being from 4:1 to 1:4.

2. A dry plaster mixture as claimed in claim 1 wherein the viscosity of the aforesaid cellulose ether is not less than 2,000 centipoises in 2 percent aqueous solution at 15° C.

3. A dry plaster mixture as claimed in claim 1 wherein the cellulose ether is methyl cellulose having a viscosity of approximately 4,250 centipoises in 2 percent aqueous solution at 15° C.

4. A dry plaster mixture as claimed in claim 1 wherein the cellulose ether is a hydroxy ethyl cellulose of viscosity approximately 4,250 centipoises in 2 percent aqueous solution at 15° C.

References Cited in the file of this patent

UNITED STATES PATENTS

| | | |
|---|---|---|
| 1,127,514 | Ramsey | Feb. 9, 1915 |
| 2,013,811 | Smith | Sept. 10, 1935 |
| 2,465,045 | Skramstad | Mar. 22, 1949 |
| 2,583,657 | Lea | Jan. 29, 1952 |
| 2,599,445 | Gordon | June 3, 1952 |
| 2,700,615 | Heijmer | Jan. 25, 1955 |
| 2,902,378 | Toulmin | Sept. 1, 1959 |
| 2,909,223 | Kaveler | Oct. 20, 1959 |
| 2,950,206 | Ostergren | Aug. 23, 1960 |
| 2,980,548 | Hampton | Apr. 18, 1961 |

FOREIGN PATENTS

| | | |
|---|---|---|
| 815,184 | Great Britain | June 17, 1959 |